United States Patent
Joshi et al.

(10) Patent No.: US 12,417,357 B1
(45) Date of Patent: Sep. 16, 2025

(54) COMPRESSION OF MODELS FOR NATURAL LANGUAGE PROCESSING

(71) Applicant: Wells Fargo Bank, N.A., San Francisco, CA (US)

(72) Inventors: Tarun Joshi, Forest Hills, NY (US); Archit Parnami, Charlotte, NC (US); Rahul Singh, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 249 days.

(21) Appl. No.: 17/818,249

(22) Filed: Aug. 8, 2022

Related U.S. Application Data

(60) Provisional application No. 63/260,245, filed on Aug. 13, 2021, provisional application No. 63/260,224, filed on Aug. 12, 2021.

(51) Int. Cl.
*G06F 40/40* (2020.01)
*G06N 3/082* (2023.01)
*G06N 20/00* (2019.01)

(52) U.S. Cl.
CPC ............. *G06F 40/40* (2020.01); *G06N 3/082* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2008/0027904 A1* | 1/2008 | Hill | G06F 16/24534 |
| 2016/0358070 A1* | 12/2016 | Brothers | G06N 3/045 |
| 2021/0125071 A1* | 4/2021 | Ren | G06N 3/04 |
| 2022/0198276 A1* | 6/2022 | Wang | G06F 40/30 |

OTHER PUBLICATIONS

Michel, Paul, et al. Are Sixteen Heads Really Better than One? Nov. 4, 2019, arxiv.org/pdf/1905.10650. Accessed Aug. 22, 2024. (Year: 2019).*

Zhou et al. "Energon: Towards Efficient Acceleration of Transformers Using Dynamic Sparse Attention." arXiv, Oct. 18, 2021, https://arxiv.org/pdf/2110.09310v1. Accessed May 14, 2025. (Year: 2021).*

Parnami, Archit et al., "Pruning Attention Heads of Transformer Models Using A* Search, A Novel Approach to Compress Big NLP Architectures", 2021, 22 pages.

* cited by examiner

*Primary Examiner* — Hai Phan
*Assistant Examiner* — Jon Christopher Meis
(74) *Attorney, Agent, or Firm* — Merchant & Gould P.C.

(57) ABSTRACT

An example electronic computing device can include: a processor; and a system memory, the system memory including instructions which, when executed by the processor, cause the electronic computing device to: receive a model for natural language processing of data, the model including a plurality of self-attention heads; prune the model by removing one or more of the plurality of self-attention heads of the model to create a pruned model; and evaluate a classification accuracy of the pruned model to maintain a performance level.

18 Claims, 5 Drawing Sheets

COMPRESSION OF MODELS FOR NATURAL LANGUAGE PROCESSING

RELATED PATENT APPLICATIONS

U.S. Patent Application No. 63/260,224 filed on Aug. 12, 2021 and U.S. Patent Application No. 63/260,245 filed on Aug. 13, 2021 are hereby incorporated by reference in their entireties.

BACKGROUND

Transformer models are used in natural language processing for such applications as language translation and document generation. These models can exhibit inherent challenges, such as occupying a large amount of memory and taking a long time to train. This can limit their application, particularly when computing resources are constrained.

SUMMARY

Embodiments discussed and described in this disclosure are directed to compression of models used for natural language processing. Among the various other benefits described herein, the discussed and described embodiments are a technical advancement in natural language processing compression and provide a solution to numerous technical challenges inherent to large natural language processing models.

In one aspect, an example electronic computing device can include: a processor; and a system memory, the system memory including instructions which, when executed by the processor, cause the electronic computing device to: receive a model for natural language processing of data, the model including a plurality of self-attention heads; prune the model by removing one or more of the plurality of self-attention heads of the model to create a pruned model; and evaluate a classification accuracy of the pruned model to maintain a performance level.

In another aspect, an example method for compressing a model can include: receiving a model for natural language processing of data, the model including a plurality of self-attention heads; pruning the model by removing one or more of the plurality of self-attention heads of the model to create a pruned model; and evaluating a classification accuracy of the pruned model to maintain a performance level.

The details of one or more techniques are set forth in the accompanying drawings and the description below. Other features, objects, and advantages of these techniques will be apparent from the description, drawings, and claims.

DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
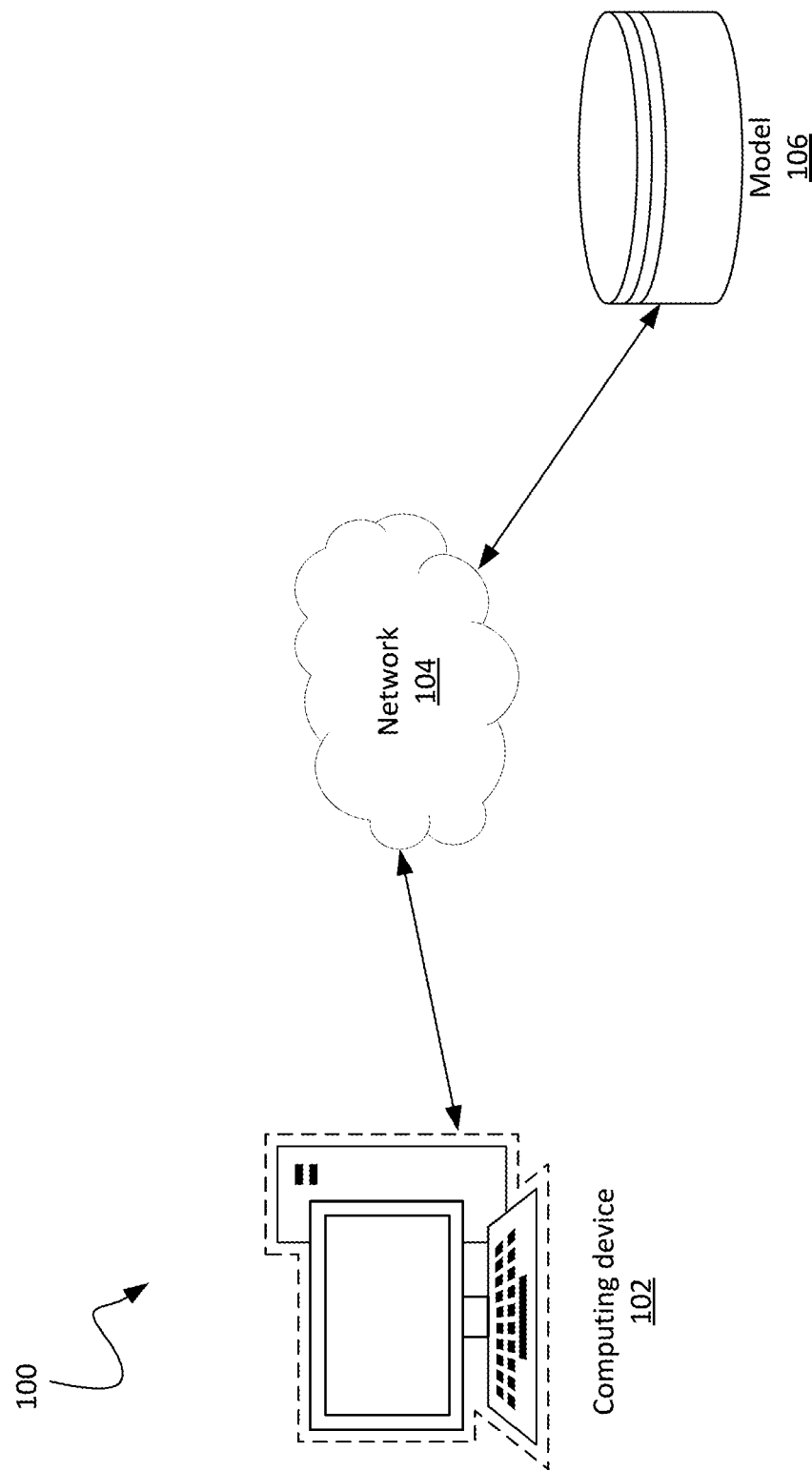
FIG. 1 shows an example system for compressing a model used in natural language processing.

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

Transformers are deep learning models used primarily for Natural Language Processing (NLP). Transformer-based models typically leverage an attention mechanism that provides context for positions in a sequential data input. This mechanism allows for parallelization, which can be advantageous when uses involve large datasets. Examples of such uses can include natural language translation, document summarization, document generation, named entity recognition, and video understanding, among others.

The sizes of transformer-based models have been growing exponentially as the technology has developed. For example, the Bidirectional Encoder Representations from Transformers (BERT) model, which is a transformer-based machine learning technique for NLP pre-training from Google, has about 340 million parameters. Similarly, the Generative Pre-trained Transformer 3 (GPT-3) model, which is an autoregressive language model that uses deep learning to produce human-like text from OpenAI, has about 175 billion parameters.

Due to the inherently large size of transformer-based models (e.g., based upon the number of parameters contained therein), one or more of the following problems can be associated with the use of these models: high memory (RAM) usage; high prediction latency; high power dissipation; poor inference performance on resource constrained devices; poor ease of training/fine-tuning; and/or difficulty in deployment and maintenance.

The examples provided herein are directed to the compression of models used for NLP in order to address one or more of the issues associated with these models. Namely, reducing high memory (RAM) usage, reducing high prediction latency, reducing high power dissipation, improving poor inference performance on resource constrained devices, improving poor ease of training/fine-tuning, and/or reducing difficulty in deployment and maintenance.

Compression, as discussed in at some examples herein, refers to reducing model (e.g., transformer-based model) size, such as reducing the number of model parameters or reducing the amount of storage needed to store the model parameters. In the examples provided herein, compressive techniques can include pruning, which can involve reducing the model size by removing certain weights (connections) or neurons or layers from the respective model.

FIG. 1 illustrates an example system 100 that facilitates compression of a model used in NLP. The system 100 includes a computing device 102, a network 104, and a model 106.

In this example, the computing device 102 is programmed to manipulate the model 106. For instance, the computing device 102 can be programmed to train, compress, and/or evaluate the performance of the model 106 using one or more of the techniques described herein.

The model 106 is an architecture used for NLP. In this example, the model 106 can be a BERT model, such as the BERT Base: 12, stored on one or more data storage devices. Other models can be used, as described further below.

The example network 104 is a computer network and can be any type of wireless network, wired network, and cellular network, including the Internet. As noted, the computing device 102 accesses the model 106 via the network 104.

Although the computing device 102 and the model 106 are depicted as single devices, in a typical environment the computing device 102 and the model 106 can be implemented as multiple devices, such as servers in server farms and/or cloud computing environments.

Figure 2:
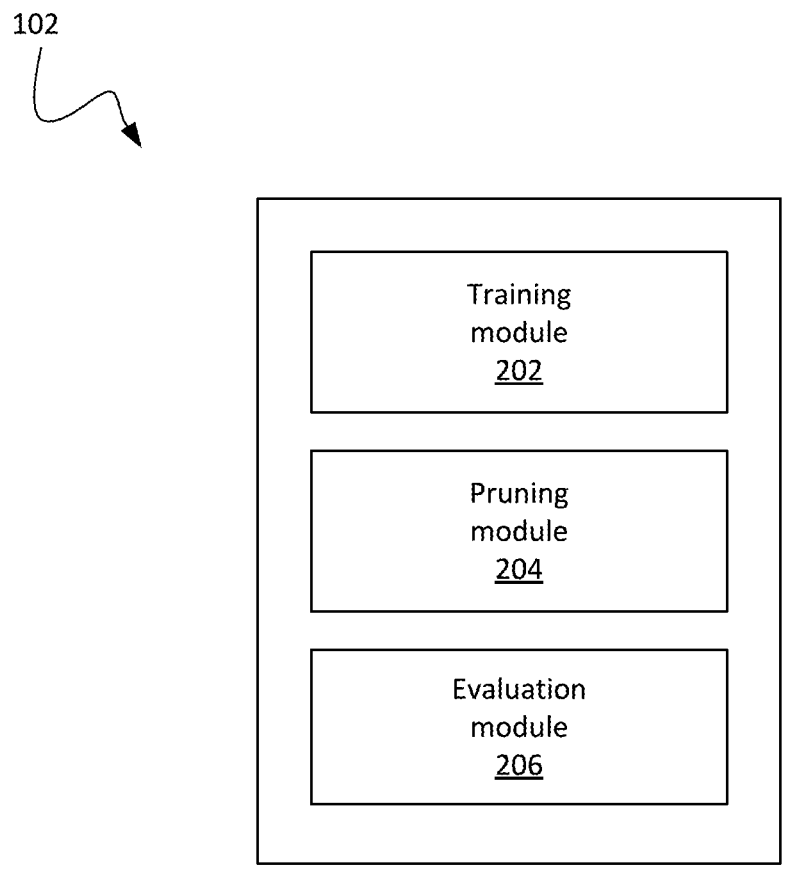
FIG. 2 shows example logical components of a computing device of the system of FIG. 1.

FIG. 2 illustrates example logical components of the computing device 102 illustrated in FIG. 1. As illustrated in FIG. 2, these components can include a training module 202, a pruning module 204, and an evaluation module 206, among various other components.

In the example shown in FIG. 1, the model 106 is a pre-trained BERT model and is fine-tuned by the computing device 102 using a training dataset. The fine-tuned model is then pruned. Next, the pruned model is evaluated by the computing device 102 for classification accuracy. In some examples, a lower bound for classification accuracy is defined.

The training module 202 of the computing device 102 is programmed to train and/or fine-tune (e.g., if the model was previously trained using a data set, modification of the model can be accomplished using a different data set) the model 106 using a given training dataset. In the examples provided, the training data set used is a product review dataset, such as the Amazon Review Dataset. In this example, the Amazon Review Dataset is used to train the model to determine sentiment of the review (e.g., positive or negative), and the model is then pruned using the techniques below. The output of the original and pruned models are compared to measure performance characteristics. Other data sets, such as a movie reviews dataset (e.g., the IMDB Movie Reviews data set), can be used.

The pruning module 204 of the computing device 102 is programmed to compress the model 106 to improve efficiencies. In this example, the model 106 is pruned by the computing device 102 using one of the chosen pruning techniques described herein.

In some examples, the pruning module 204 prunes the model 106 by removing self-attention heads of the model 106. Self-attention heads function to analyze input data (e.g., strings of words, like reviews) and help to identify which portions of the input data are most important (e.g., which words in a string deserve the most "attention"). Self-attention heads can be found in a self-attention layer of the model 106. Each self-attention layer can include a specified number of self-attention heads, such as 12 self-attention heads in the example provided. The pruning module 204 prunes (re- moves) self-attention heads as a way to compress the model 106 while still maintaining a specified level of performance, as described further below.

The evaluation module 206 of the computing device 102 is programmed to evaluate the classification accuracy of the model 106 after pruning. This can be accomplished by testing the model 106 after compression using a test data set and comparing the results to the unpruned (original) model.

Figure 3:
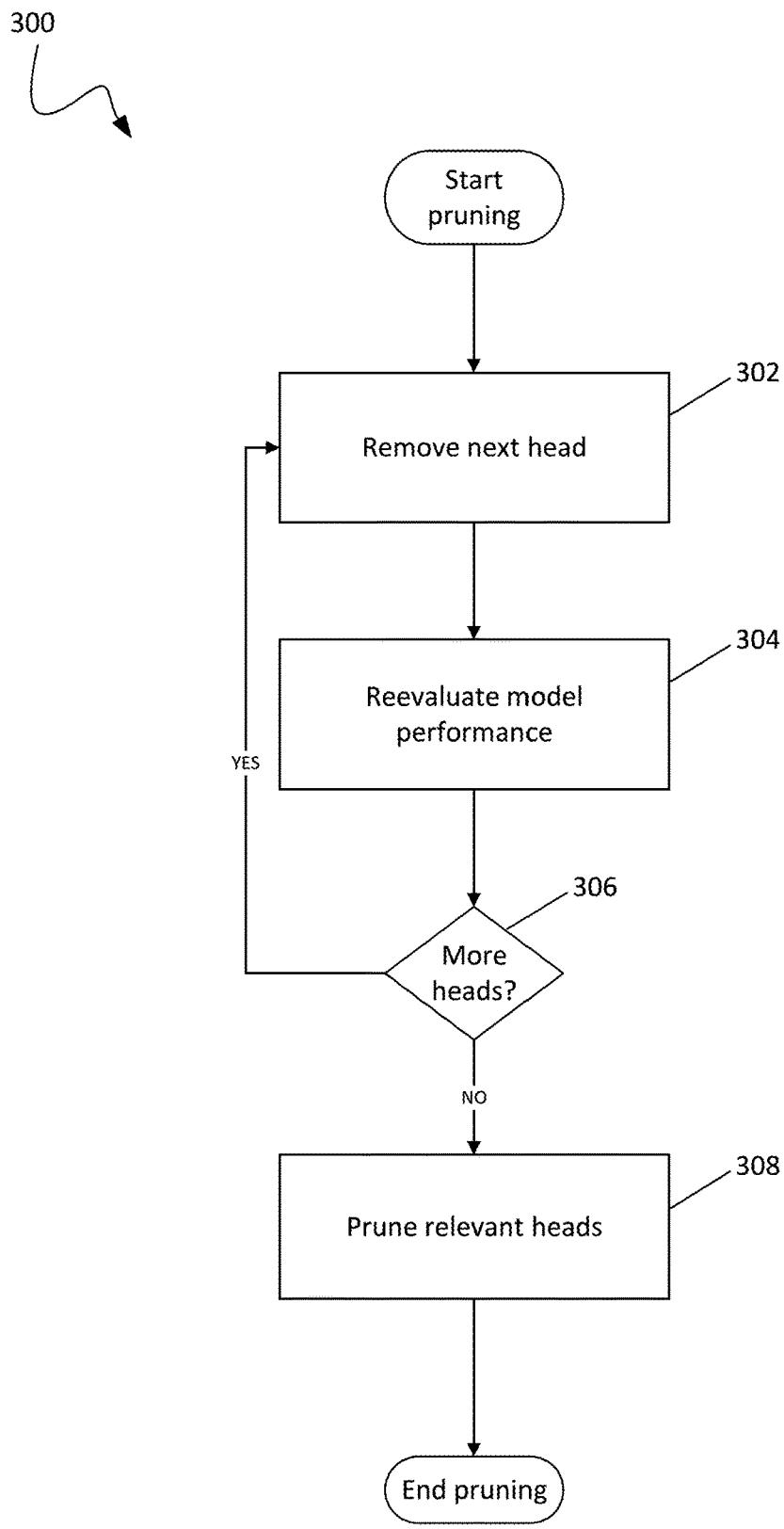
FIG. 3 shows an example method for compressing the model of the system of FIG. 1.

FIG. 3 shows an example method 300 for compressing the model 106 using the computing device 102 of the system 100. Generally, the method 300, which can be implemented by the computing device 102, involves pruning of a trained model.

At operation 302, one of the self-attention heads of the model 106 is pruned.

The self-attention heads of the model 106 can be pruned both locally (within a single layer), where the self-attention head(s) are removed sequentially. Further, the self-attention heads of the model 106 can be pruned globally, where the self-attention head(s) are removed from all the self-attention layers. As previously noted, the example model 106 can be a BERT Base: 12 model having 12 self-attention layers, with each of these attention layers having 12 self-attention heads. Pruning is conducted by sequentially removing self-attention heads from the model 106 according to the method 300.

It is appreciated that in other examples, other models can be pruned based on the innovative techniques described herein. Those other models may have more or less than 12 self-attention layers, and more or less than 12 self-attention heads.

Returning to the given examples, the self-attention heads of the BERT model are pruned using A* search ("A-star" search). A* is an informed search heuristic function, which is formulated in terms of weighted graphs. Starting from a specific starting node of a graph, the function finds a path to a given goal node having the smallest cost (least distance travelled, shortest time, etc.). A* accomplishes this by maintaining a tree of paths originating at the start node and extending those paths one edge at a time until its termination criterion is satisfied.

At each iteration of its main loop, A* determines which of its paths to extend. It does so based upon the cost of the path and an estimate of the cost required to extend the path all the way to the goal. Specifically, A* selects the path that minimizes the following Equation 1.

$$f(n)=g(n)+h(n) \quad (1)$$

where:
  n is the next node on the path;
  g(n) is the cost of the path from the start node to n; and
  h(n) is a heuristic function that estimates the cost of the cheapest path from n to the goal.

A* terminates when the path it chooses to extend is a path from start to goal, or if there are no paths eligible to be extended. The heuristic function is problem-specific.

For pruning with A*, the following example constraint variables are defined to guide the search.

Baseline (A)—model's performance (accuracy) before pruning
  Budget (B)—maximum amount of accuracy loss that can be afforded for compression gains
  Accuracy post pruning (P)—accuracy of pruned model (can be depicted as an accuracy matrix of size m×n, where m in the number of self-attention layers and n is the number of self-attention heads in each layer)
  Cost (C)—drop in performance of the model from A during pruning: A-P (can be depicted as a cost matrix of size m×n, where cost of each self-attention head is the drop in its accuracy from baseline)

List (L)—list of self-attention heads to prune

Search Space (S)—number of self-attention heads that have not been pruned/eliminated Heuristic (H)—estimated cost of pruning a self-attention head in next iteration However, the above example procedure may still require re-computation of the C matrix (i.e., cost of pruning remaining self-attention heads in each iteration). By recomputing the cost of pruning self-attention heads that are most likely going to fit in the budget (B) while not recomputing the higher costing self-attention heads, the number of reevaluations (searches) in each iteration can be reduced and an optimal example solution is arrived at more quickly.

To implement this, another variable is defined as the Heuristic (H). H is used to estimate the cost of pruning a self-attention head in the next iteration. For example, to accomplish this in iteration 0, one starts with P and prunes the self-attention head with the least cost. In the next iteration 1, one needs to know the cost of pruning remaining self-attention heads given the first self-attention head has been pruned. H is used to estimate this cost.

In this non-limiting example, H can be chosen for the A* pruning as follows. Let the cost of pruning (drop in accuracy) for self-attention head (i, j) in iteration k equal $C_{(i,j)}^k$.

Since in each iteration, a new self-attention head is pruned, it is assumed that the cost of pruning the same self-attention head (i, j) in next iteration is going to increase (i.e., if (i, j) was not pruned in iteration k and another self-attention head with least cost was pruned).

Let the true cost of pruning self-attention head (i, j) in iteration k+1=$C_{(i,j)}^{k+1}$.

Let the estimated cost (as per the heuristic) of pruning head (i, j) in iteration k+1=$E_{(i,j)}^{k+1}$.

Then, the heuristic (H) can be used to estimate the cost of pruning a self-attention head in the next iteration to be the same as the cost of pruning it in the current iteration: $E_{(i,j)}^{k+1}=C_{(i,j)}^k$.

Under the assumption that pruning results in loss in accuracy or increase in cost, one can say that $C_{(i,j)}^k < C_{(i,j)}^{k+1}$ and hence the estimated cost will be less than the true cost $E_{(i,j)}^{k+1} < C_{(i,j)}^{k+1}$. This allows the heuristic (H) to not overshoot the true cost and hence will not eliminate an excessive number of self-attention heads during search.

Next, at operation 304, a performance level of the model 106 after pruning is reevaluated on the test data set. In one example, performance is reevaluated using test data as described by the method 300. For instance, as shown below (see FIG. 4), test data is analyzed by the model 106 after pruning, and performance of the pruned model 106 is compared to performance of the unpruned model 106. In the specific example provided, the performance of the pruned model 106 in understanding the sentiment of product reviews from the Amazon data set is compared to the performed of the unpruned model 106.

Next, at operation 306, a determination is made whether remaining self-attention heads are left to be pruned. If so, control is passed back to operation 302, and the next self-attention head is pruned. In examples provided herein, pruning continues until performance of the model 106 degrades a specified amount, such as exceeding a budget. In example embodiments, the budget defines a maximum amount of classification accuracy for the model 106 that can be sacrificed in exchange for compression gains for the model. In other words, the example budget defines a required performance level for the model 106.

Otherwise, at operation 308, a determination of which self-attention heads to prune is made based upon the outcome of the iterative pruning process of the method 300.

The example method 300 therefore works in an iterative fashion and removes the lowest performing self-attention head in a single iteration. At each iteration, one recalculates the heuristic (H) to find the search space for possible self-attention heads that can be removed without exceeding the budget (B). The pruning algorithm stops when the budget (B) is crossed. At the end of pruning process, there is a list of self-attention heads that can be pruned without crossing the budget (B).

One non-limiting example of the method 300 is provided below.

```
BEGIN Algorithm
  Set B
  Set S = m * n
  While B > 0 and S > 0:
    Calculate P (i.e., post-pruning accuracy of the unpruned self-attention
    heads)
    Calculate C = A - P (i.e., compute cost for the unpruned self-attention
    heads)
    Sort the cost (C) of the unpruned self-attention heads in the ascending
    order
    Let X be the self-attention head with lowest cost in C
    Let Cx be the cost of X
    If Cx < 0 Then
      Set Cx = 0
    IF Cx <= B Then
      Mark X has pruned
      Add X to L
      Update B = B - Cx
      Update S = S - 1
      If S > 0 Then
        Set E = 0 (i.e., total estimated cost of pruning remaining
        self-attention heads in S)
        For each self-attention head y in S (i.e., remaining self-
        attention heads sorted by increasing cost)
          Let Cy be the estimated (H) non-negative cost of
          pruning y given self-attention heads in L have been pruned
          IF E + Cy <= B, Then
            E = E + Cy
          ELSE
            Mark y and the remaining unvisited self-
            attention heads as eliminated
            Let K = number of remaining unvisited self-
            attention heads + 1
            Update S = S - K
            BREAK
    ELSE
      BREAK
  from  RETURN L
END Algorithm
```

Specific non-limiting examples of the method 300 follow. In these examples, a data set, such as the Amazon product review data set described above, is used to train the model 106. Self-attention heads are thereupon sequentially pruned from the model 106 using the method 300.

In one specific example that operates on the model 106 trained as noted above, using the method 300, it is possible to prune at least 57 out of 144 self-attention heads, which is a reduction of 40 percent of the self-attention heads in the model 106 without a significant drop in accuracy. Moreover, with an allocated budget (B) of 2.5, pruning using A* is able to prune at least 102 self-attention heads, which is a 70.8 percent reduction of the self-attention heads.

In this specific example, the pre-pruning or baseline accuracy is 92.46 percent, and the post-pruning accuracy is at least 89.97 percent. In this manner, the example method 300 can compress at least 70 percent of weights of the model 106 on the task of sentiment analysis for little to no drop in performance.

Figure 4:
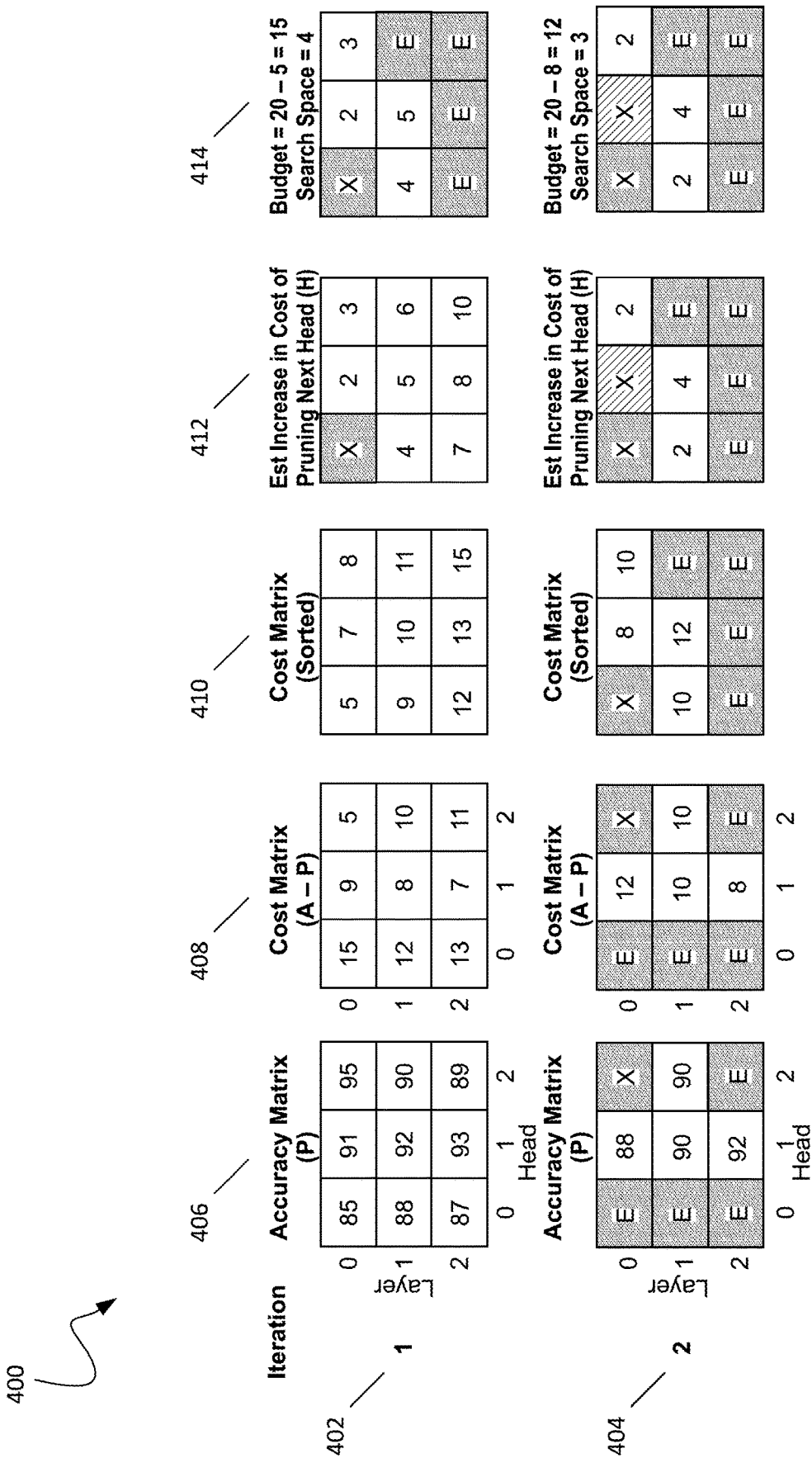
FIG. 4 shows example matrices illustrating the method for compressing of FIG. 3.

FIG. 4 shows a graphical depiction 400 of matrices associated with an example of pruning using A*. In this example, the following constraints are defined.

A=100
B=20
P=90
C=A-P=10
H=estimated cost of pruning a self-attention head in next iteration=cost calculated in current iteration
S=144 self-attention heads in iteration 0

In other examples, different values for the constraints can be used. For example, the budget (B) can be increased or decreased based upon the desired level of performance.

In this example, multiple iterations 402, 404 are shown for layers 0-2 of the model 106. It is appreciated that in various other examples, the model 106 may have numerous other layers. That is, the number of layers may depend on the specific model and/or use of the model. For the sake of explanation, in this example the model 106 is discussed as having layers 0, 1, and 2. For the iteration 402, an accuracy matrix 406 and cost matrix 408 are defined for each transformer in layers 0-2.

A sorted cost matrix 410 lists the "cost" associated with pruning each self-attention head in order from the least cost to the most (i.e., greatest) cost. An estimate of the cost of pruning the "least" cost self-attention head ("5") is depicted by the matrix 412. Finally, with a defined budget (B) of 20, a matrix 414 defines a search space of "4". The iteration 404 proceeds in a similar manner.

Within each of the example matrices of the graphical depiction 400, "X" represents a pruned self-attention head and "E" represents a self-attention head eliminated by A* search. These self-attention heads are shaded in the graphical depiction 400.

In this example, in iteration 402, the least cost of pruning a self-attention head is 5, so the self-attention head corresponding to this cost (X) is pruned. The available budget (B) is 20−5=15 in this example. With the budget in this example, it is possible to prune the self-attention heads with estimated costs of 2, 3, 4, 5, as the sum 14 of those self-attention heads is within the budget of 15. The remaining high costing self-attention heads are eliminated from search.

There can be various advantages associated with compression of the models described herein. For instance, the pruning can result in a reduced memory footprint and reduced search times for the model. This results in greater efficiencies and allows for use of the models for NLP in other environments, such as mobile devices with limited resources. Other possible advantages include one or more of improved prediction latency and power dissipation, along with greater ease in training and deployment. This is accomplished while still maintaining a desired level of performance for the models.

While the examples provided herein are related to transformer models for NLP, the concepts can be applied to other types of modeling and uses. For instance, the concepts could be applied for compression of other types of networks, such as feed-forward neural networks and convolutional neural networks, to remove neurons and therefore increase efficiencies. Other applications are possible.

In addition, other pruning options are available depending on the type of model and performance goals. For instance, pruning of neurons or blocks (structured) or connections or weights (unstructured) can be done. In other examples, pruning of the lowest percentage of weights (magnitude) or certain percentage of weights randomly (random) can be done. Other configurations are possible.

Figure 5:
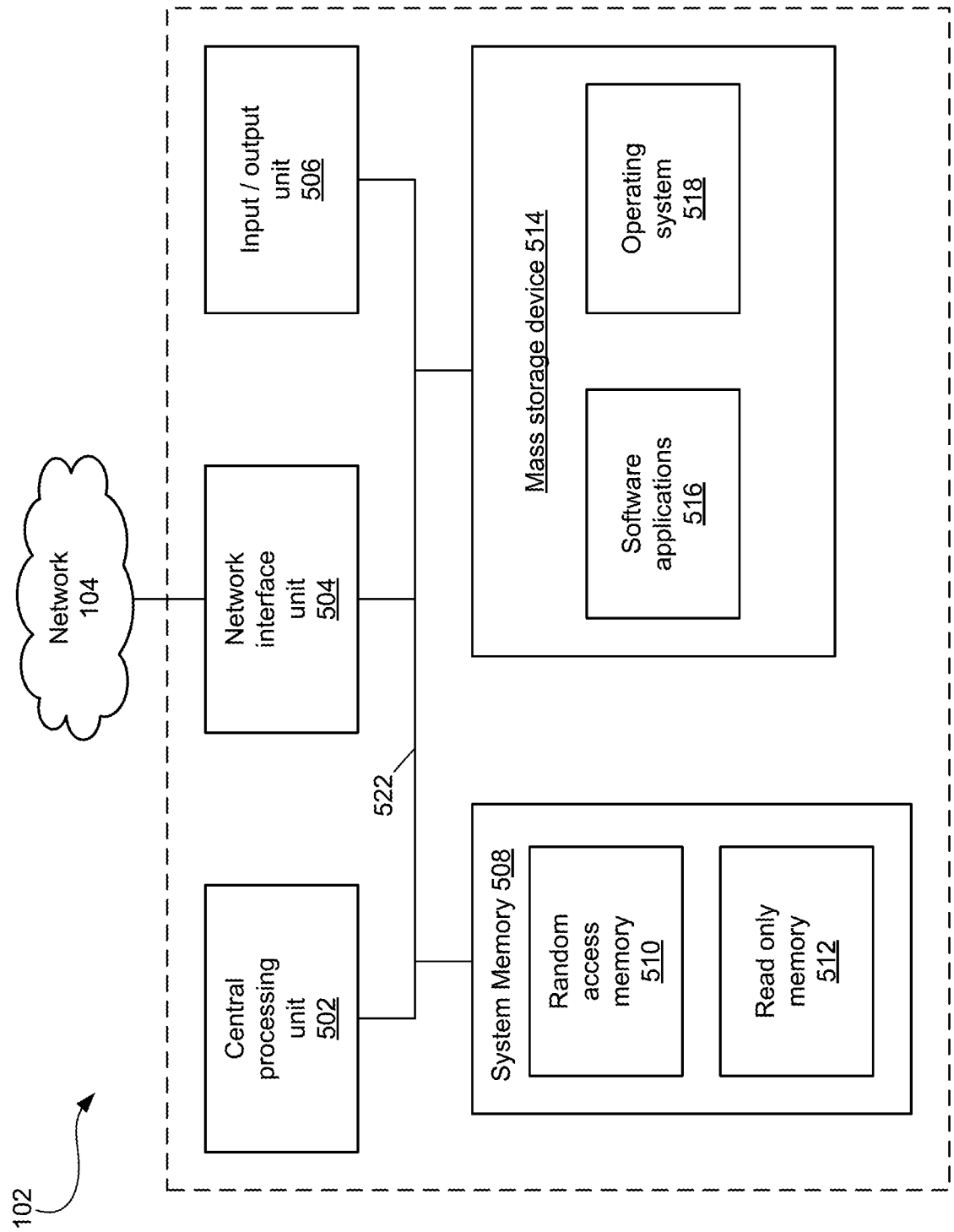
FIG. 5 shows example components of the computing device of the system of FIG. 1.

As illustrated in FIG. 5, the example computing device 102 includes at least one central processing unit ("CPU") 502, also referred to as a processor, a system memory 508, and a system bus 522 that couples the system memory 508 to the CPU 502. The CPU 502 can alternatively be a graphics processing unit ("GPU").

The system memory 508 includes a random access memory ("RAM") 510 and a read-only memory ("ROM") 512. A basic input/output system that contains the basic routines that help to transfer information between elements within the computing device 102, such as during startup, is stored in the ROM 512. The computing device 102 further includes a mass storage device 514. The mass storage device 514 is able to store software instructions and data.

The mass storage device 514 is connected to the CPU 502 through a mass storage controller (not shown) connected to the system bus 522. The mass storage device 514 and its associated computer-readable data storage media provide non-volatile, non-transitory storage for the computing device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 102.

According to various embodiments of the invention, the computing device 102 may operate in a networked environment using logical connections to remote network devices through the network 104, such as a wireless network, the Internet, or another type of network. The computing device 102 may connect to the network 520 through a network interface unit 504 connected to the system bus 522. It should be appreciated that the network interface unit 504 may also be utilized to connect to other types of networks and remote computing systems. The computing device 102 also includes an input/output controller 506 for receiving and processing input from a number of other devices, including a touch user interface display screen, or another type of input device. Similarly, the input/output controller 506 may provide output to a touch user interface display screen or other type of output device.

As mentioned briefly above, the mass storage device 514 and the RAM 510 of the computing device 102 can store software instructions and data. The software instructions include an operating system 518 suitable for controlling the operation of the computing device 102. The mass storage device 514 and/or the RAM 510 also store software instructions and software applications 516, that when executed by the CPU 502, cause the computing device 102 to provide the functionality of the computing device 102 discussed in this document. For example, the mass storage device 514 and/or the RAM 510 can store software instructions that, when executed by the CPU 502, cause computing device 102 to display data on the display screen of the computing device 102.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. An electronic computing device, comprising:
   a processor; and
   a system memory, the system memory including instructions which, when executed by the processor, cause the electronic computing device to:
   define a budget that quantifies a maximum amount of a classification accuracy that is sacrificed;
   receive a model for natural language processing of data, the model including a plurality of self-attention heads;
   prune the model by removing one or more of the plurality of self-attention heads of the model to create a pruned model based on a computed cost of pruning the one or more of the plurality of self-attention heads of the model;
   evaluate a classification accuracy of the pruned model to maintain a performance level;
   determine whether remaining self-attention heads of the plurality of self-attention heads should be pruned based on the budget and the classification accuracy of the pruned model; and
   when the remaining self-attention heads of the plurality of self-attention heads should be pruned:
   determine, using a heuristic, an estimated cost of pruning the remaining self-attention heads in a next iteration of pruning, wherein the heuristic determines the estimated cost of pruning the remaining self-attention heads in the next iteration of pruning based on the computed cost in a current iteration; and
   update the computed cost of pruning for the remaining self-attention heads for which the estimated cost of pruning is less than a remaining amount of the budget.

2. The electronic computing device of claim 1, wherein the model is a Bidirectional Encoder Representations from Transformers model or a Generative Pre-trained Transformer model.

3. The electronic computing device of claim 1, further comprising instructions which, when executed by the processor, cause the electronic computing device to train the model using a given training dataset.

4. The electronic computing device of claim 1, further comprising instructions which, when executed by the processor, cause the electronic computing device to use an A* algorithm to prune the model.

5. The electronic computing device of claim 4, wherein the A* algorithm is a search heuristic algorithm.

6. The electronic computing device of claim 1, further comprising instructions which, when executed by the processor, cause the electronic computing device to iterate through each of the plurality of self-attention heads of the model when pruning the model.

7. The electronic computing device of claim 6, further comprising instructions which, when executed by the processor, cause the electronic computing device to calculate a performance cost associated with pruning the model.

8. The electronic computing device of claim 1, further comprising instructions which, when executed by the processor, cause the electronic computing device to compare a pruned classification accuracy of the model after pruning to an original classification accuracy of the model before pruning, to determine the performance level of the model.

9. The electronic computing device of claim 1, wherein the budget defines a boundary for the classification accuracy.

10. A method for compressing a model, the method comprising:
    defining a budget that quantifies a maximum amount of a classification accuracy that is sacrificed,
    receiving a model for natural language processing of data, the model including a plurality of self-attention heads;
    pruning the model by removing one or more of the plurality of self-attention heads of the model to create a pruned model based on a computed cost of pruning for said one or more of the plurality of self-attention heads of the model;
    evaluating a classification accuracy of the pruned model to maintain a performance level; and
    determining whether remaining self-attention heads of the plurality of self-attention heads should be pruned based on the budget and the classification accuracy of the pruned model;
    when the remaining self-attention heads of the plurality of self-attention heads should be pruned:
    determining, using a heuristic, an estimated cost of pruning the remaining self-attention heads in a next iteration of pruning, wherein the heuristic determines the estimated cost of pruning the remaining self-attention heads in the next iteration of pruning based on the computed cost in a current iteration; and
    updating the computed cost of pruning for the remaining self-attention heads for which the estimated cost of pruning is less than a remaining amount of the budget.

11. The method of claim 10, wherein the model is a Bidirectional Encoder Representations from Transformers model or a Generative Pre-trained Transformer model.

12. The method of claim 10, further comprising training the model using a given training dataset.

13. The method of claim 10, further comprising using an A* algorithm to prune the model.

14. The method of claim 13, wherein the A* algorithm is a search heuristic algorithm.

15. The method of claim 10, further comprising iterating through each of the plurality of self-attention heads of the model when pruning.

16. The method of claim 15, further comprising calculating a performance cost associated with pruning the model.

17. The method of claim 10, further comprising comparing a pruned classification accuracy of the model after pruning to an original classification accuracy of the model before pruning to determine the performance level.

18. The method of claim 10, wherein the budget defines a boundary for the classification accuracy.

* * * * *